Nov. 23, 1948.          J. BUDZINSKI                2,454,592
            CABLE EYE AND METHOD OF SPLICING THE SAME
Filed Jan. 31, 1948                           2 Sheets-Sheet 1
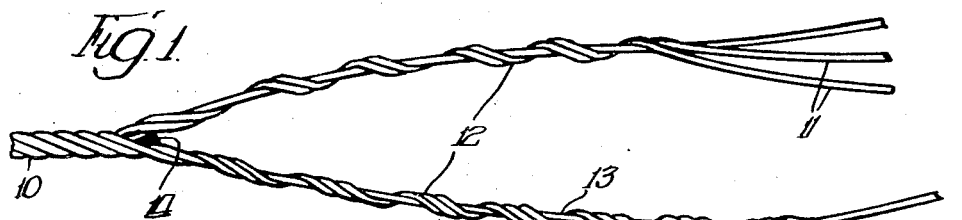
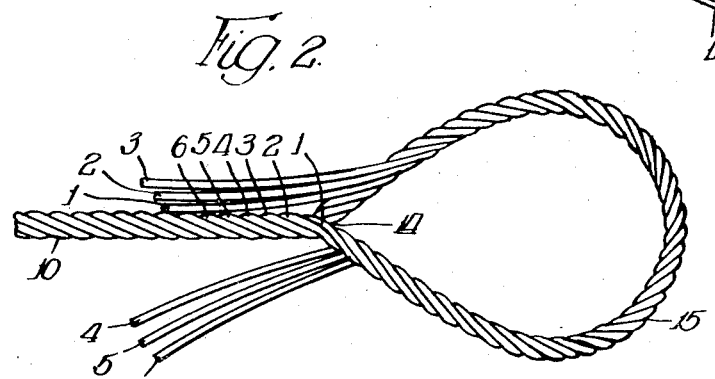
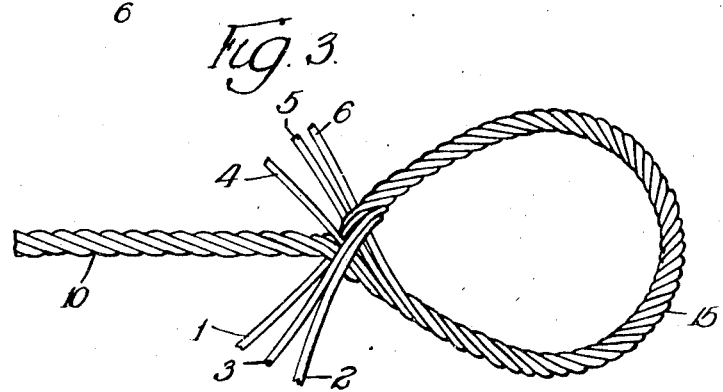
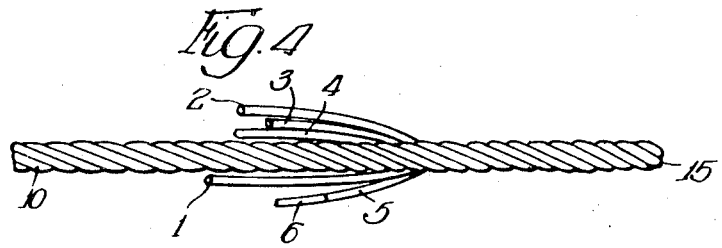
INVENTOR.
Joseph Budzinski,
BY

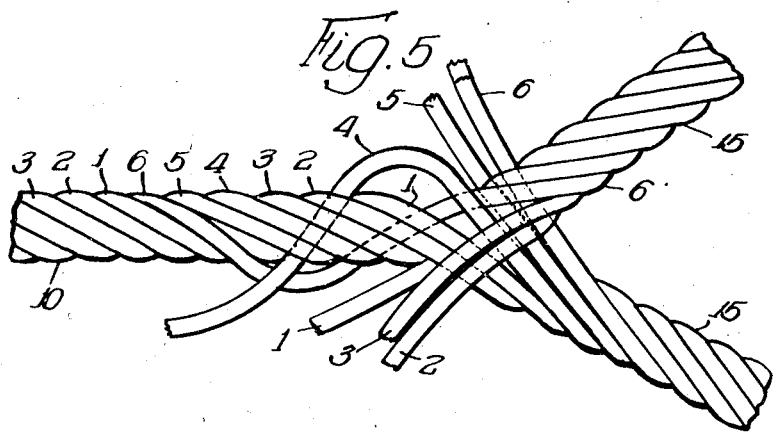
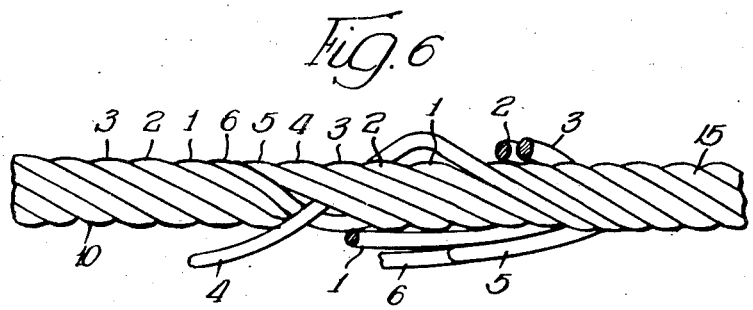
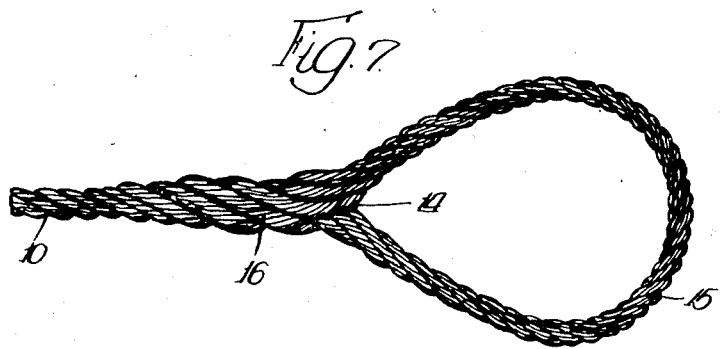

Patented Nov. 23, 1948

2,454,592

UNITED STATES PATENT OFFICE 2,454,592

CABLE EYE AND METHOD OF SPLICING THE SAME

Joseph Budzinski, Kenosha, Wis.

Application January 31, 1948, Serial No. 5,651

8 Claims. (Cl. 57—142)

The present invention relates to a cable splice employed in making an eye or a sling at an end of a cable, and has for its object the provision of an improved splice whereby the strands of a cable forming the eye may be firmly united to the body of the cable.

Another object of the present invention is the provision of a splice for forming an eye in a cable and in which, as a preliminary step of forming an eye, the body of a cable is divided into a pair of halves or bundles containing an equal, and in case of a cable having an odd number of strands, an approximately equal, number of principal strands, and thereupon the two bundles are entwined for forming an eye, with the free ends of the strands in the two bundles separated and brought to a proper positional distribution with relation of the perimeter of the body of a cable with which they are ultimately spliced in order that the stresses resulting from the pull exerted upon the eye may be uniformly distributed among the several spliced strands.

A further object of the present invention is to devise a suitable method in accordance with which the individual principal strands which have formed an eye in a cable may be brought to a proper predetermined positional relation with respect to the body of the cable preliminarily to the splicing operation thereof with the body of the cable.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views:

Fig. 1 is an elevational view of a cable having its end separated into a pair of bundles, each having an equal number of principal strands, with a core of the cable still in an original operative relation with one of said bundles, the view illustrating a preliminary step in the formation of an eye;

Fig. 2 is a plan view of a cable with an eye formed from the two bundles, with the end of core cut off adjacent the crotch of the eye, illustrating the position of the free ends of strands prior to their manipulation so as to bring them to a proper positional relation with the body of the cable preceding splicing operation thereof to the body of the cable;

Fig. 3 is a similar view showing the position of the strands preliminary to the splicing operation thereof;

Fig. 4 is a side elevational view of the cable, eye and the strand ends in their position shown in Fig. 3;

Fig. 5 is an enlarged, fragmentary view of the crotch portion of the eye, illustrating a step in the splicing operation of the free ends of strands;

Fig. 6 is a side elevation of parts shown in Fig. 5; and

Fig. 7 is an elevational view of the cable and the formed eye at the end thereof after splicing operation has been completed.

Referring to the present drawings in detail, there is shown therein cable 10 composed of a plurality of principal strands 11. Each of the said principal strands is formed of a plurality of thinner strands, which for the sake of clearness are not shown in the drawings, except in Fig. 7. As a preliminary step in the eye formation the strands thereof at the end of the cable are separated into a pair of bundles 12, each containing an equal number of strands 11, as is seen in Fig. 1. While this separation takes place care is taken that each bundle should preferably preserve its original convolution impressed thereto while in the original cable, as seen in Fig. 1. Core 13 is retained within one bundle 12. Separated bundles 12 from the body of cable 10 may be as long as desired depending upon the required size of the eye to be formed therefrom. The inner ends of bundles 12 in conjunction with the adjacent body of cable 10 from which they project define crotch 14.

To form eye 15 bundles 12 are crossed and then mutually intertwined toward crotch 14, by causing each bundle to follow original lay or convolution of the other bundle, until the free ends of strands of each bundle 12 are brought to the proximity of crotch 14, that is to the distance equivalent to a single twist of the free end of each bundle 12 around the base of the opposite bundle 12 adjacent crotch 14, as is seen in Fig. 2. When this has been accomplished eye 15 has been almost completely formed with core 13 embedded therewithin. When eye 15 has been formed to the extent shown in Fig. 2, the free end of core 13 is cut off along the perimeter of eye 15, so that only the free ends of the strands in two bundles 12 forming said eye 15 project therefrom.

Since from this stage of the procedure the free ends of the strands forming two bundles 12 are individually manipulated as preliminary steps to the splicing operation of said strands with the body of cable 10, said strands are therefore individually indicated by 1, 2, 3, 4, 5 and 6. On reference to Fig. 2 it is observed that the ends of strands 1, 2 and 3, constituting one bundle 12, remain on one side of the plane of eye 15, while the ends of strands 4, 5 and 6, constituting the remaining bundle 12, are disposed at the opposite side of the plane of eye 15.

The step in the operation presently under discussion contemplates intermingling at least one strand of one group with the strands of the opposite group while preserving their mutual correlation and their correlation with the body of cable 10 and eye 15 as formed to the extent shown in Fig. 2. This step includes continuation of the twist of strands 4, 5 and 6, substantially 360 degrees from their position in Fig. 2, until they assume the position illustrated in Fig. 3. This twist will substantially fill the space between crotch 14 and the position of said strands shown in Fig. 2 in the bundle around which said strands were entwined. Strand 14 is left on the original side of the plane of eye 15, as viewed in Fig. 3, while strands 5 and 6 are passed through eye 15 and are left on the opposite side of the plane of eye 15. This operation separates strand 4 from strands 5 and 6, with the base of the same bundle 12, on the opposite side of crotch 14, interposed therebetween, as is clearly shown in Figs. 3 and 4.

A similar operation is resorted to with the free ends of strands 1, 2 and 3 of the opposite bundle 12. Namely, said latter strands are likewise twisted substantially to the extent of 360 degrees from the position shown in Fig. 2. This operation will entwine said strands 1, 2 and 3 around the unfilled lay of opposite bundle 12, adjacent crotch 14, and will bring them to the opposite side of the plane of eye 15, filling said lay along the lead thereof. During this operation, strand 1 is left on the side of the plane of eye 15 to which the same was ultimately brought by the last mentioned operation, while strands 2 and 3 are passed through eye 15 and brought to the opposite side of the plane of eye 15. Thus, strand 1 on one hand, and strands 2 and 3, on the other, hold crotch 14 interposed therebetween.

From the hereinabove description it will be readily seen that by the operation last hereinabove described strands 2, 3 and 4 remain on one side of the plane of eye 15, while strands 1, 5 and 6 remain on the opposite side of the plane of eye 1F, as is seen in Fig. 4, and it should be noted that strand 4 belongs to one bundle 12 and strands 2 and 3 to the opposite one, while strand 1 belongs to the last named bundle, while strands 5 and 6 belong to said first named bundle 12. This arrangement intermingles several strands in the two bundles with relation to the body of cable 10, crotch 14 and eye 15 and enhances not only the strength of the splice by evenly distributing the stresses to the two bundles and the two groups of intermingled strands, but also lays a foundation for splicing operation hereinafter described and the symmetrical appearance of the splice as seen in Fig. 7.

It should also be noted that strand 4 is interposed between strands 2 and 3 on one hand, and crotch 14, on the other, while strand 1 remains interposed between strands 5 and 6 on one hand, and crotch 14, on the other. This relative mutual position of the several strands in two bundles 12 as well as their relative position with relation to crotch 14 and the two sides of the plane of eye 15 has for its object the intermingling of the several strands in the two bundles in accordance with a predetermined plan which not only facilitates the splicing operation but also adds to the characteristics of the splice hereinabove noted.

Referring more particularly to Figs. 5 and 6 the strands in body 10 of the cable are marked from 1 to 6, inclusive, as indicating the free ends of the respective identical strands indicated by the corresponding numeral characters from 1 to 6, inclusive, in the two bundles 12, the latter being continuations of the same strands which are in body 10 of the cable. It is further observed that strands 1, 2 and 3, leaving body 10 of the cable follow one bundle 12, constituting an integral part thereof, while strands 4, 5 and 6 separate at crotch 14 and follow the other bundle 12 constituting a part thereof. As viewed in Figs. 2, 5 and 6 the first strand at crotch 14 on one side of the plane of eye 15 is strand 1, while at the opposite side of the plane of eye 15 the first strand at said crotch 14 is strand 4. Thus, the nearest strands in body 10 of the cable to crotch 14 at one side of the plane of eye 15 are strands 1, 2 and 3, while the nearest strands in body 10 of the cable to crotch 14 at the opposite side of the plane of eye 15 are strands 4, 5 and 6, both in sequences stated.

It is further observed that when two bundles 12 preliminarily to their mutual entwining for forming eye 15 are crossed at points which are at the same distance from crotch 14, and the free ends of the strands in the two bundles brought to the position shown in Fig. 2, with unfilled lay at the base of each bundle 12 adjacent crotch 14 requiring substantially only the full twist of the free ends of the strands of the opposite bundle thereabout in order to fill the same, then it must necessarily follow that on one side of the plane of eye 15 the nearest strand to crotch 14 in the body of cable 10 will be strand 1, while at the opposite side of the plane of eye 15 the nearest strand in body 10 of the cable will be strand 4.

With the above preliminary observations the final procedure of splicing is resorted to, for the purpose of entwining the free ends of strands 1 to 6, inclusive, around the strands in body 10 of the cable. Broadly, the splicing operation consists of entwining the free ends of the commingled group of strands on each side of the plane of eye 15 to the strands in body 10 of the cable which are on the corresponding side of the plane of eye 15 and in the nearest proximity of crotch 14.

If the splicing operation is commenced with the free end of strand 4, the same is tucked under strand 6 in body 10 of the cable. The tucking operation is facilitated by a suitable tool inserted under strand 6 in body 10 of the cable for providing an opening between it and body 10 of the cable for insertion therewithin of the free end of strand 4, as is seen in Figs. 5 and 6. When the insertion and partial entwining of the said free end of strand 4 has taken place the same is shifted along strand 6 towards crotch 14, and from there the free end of strand 4 is continued to be entwined around strand 6, and as far therealong from crotch 14 as is desired or as the length of the free end of strand 4 will permit. Similar operation is resorted to with the free ends of the remaining strands, except that the free end of strand 3 is tucked under and entwined around strand 1 in body 10 of the cable, free end of strand 2 tucked under and entwined around strand 2 in body 10 of the cable, strand 1 tucked under and entwined around strand 3 in body 10 of the cable, free end of strand 6 tucked under and entwined around strand 4 in body 10 of the cable, and the free end of strand 5 tucked under and entwined around strand 5 in body 10 of the cable. Thus, the splicing operation of the free ends of the several strands to the strands in body 10 of the cable may be readily visualized by the following table:

Free end of strand 4 spliced to strand 6 in the cable body

Free end of strand 3 spliced to strand 1 in the cable body

Free end of strand 2 spliced to strand 2 in the cable body

Free end of strand 1 spliced to strand 3 in the cable body

Free end of strand 6 spliced to strand 4 in the cable body

Free end of strand 5 spliced to strand 5 in the cable body

From the hereinabove table it will be readily seen that the free ends of strands 2 and 5 only are spliced to the same corresponding strands in body 10 of the cable. It is further noted that each of said strands 2 and 5 remains at the opposite side of the plane of eye 15. The entwining operation of the free ends of the several strands around the strands in body 10 of the cable, in accordance with the above table, should commence at points of the latter strands which are nearest to crotch 14. It is also observed that the free ends of strands 1, 2 and 3, belonging to one bundle 12 are spliced to the strands in body 10 of the cable which constitute the continuation of the same bundle, while strands 4, 5 and 6, belonging to the other bundle 12, are spliced to the strands in body 10 of the cable which are a continuation of the strands of said latter bundle 12.

There is another correlation between the two groups of strands defined by two bundles 12 and the respective groups of the strands in body 10 of the cable to which the former are spliced. Namely, the free ends of strands belonging to one bundle 12 are spliced to three strands in the body of the cable which are nearest to crotch 14 on one side of the plane of eye 15, while the free ends of the strands belonging to other bundle 12 are spliced to the three strands in the body of the cable which are nearest to crotch 14 on the opposite side of eye 15.

The splicing operation need not necessarily be followed in the same sequence as shown in the above table, provided that the free ends of strands in two bundles 12 are entwined around the respective strands in body 10 of the cable in accordance with the general principle shown in the said table.

In the case of a seven-strand cable the end of the latter is preferably separated into a four-strand bundle and a three-strand bundle. The four-strand bundle may be divided with relation to the plane of eye 15 so that one or two strands thereof may fall within the group represented either by strand 1 or 4, and the remaining strands thereof may be treated as belonging to the group represented either by strands 2—3 or 5—6, as the case may be. In an eight-strand cable the separation thereof may be made into a pair of four-strand bundles and the division of each bundle is followed as outlined in the last preceding sentence. In a ten-strand cable separation thereof is made into a pair of five-strand bundles. In the latter case two strands of each bundle may be assigned to the two groups of strands represented by strands 1 and 4, while the remaining three strands of each bundle may be treated as belonging to the groups of strands represented by strands 2—3 and 5—6. In all of these cases, as well as in the cases of cables having more than ten strands, the preliminary procedure as described in connection with a six-strand cable is followed, bearing in mind that strands 1 to 6, inclusive, do not necessarily represent single strands as in the case of a six-strand cable, but may each stand for a group of strands in a cable having a larger number of strands than six. In all of the cases suggested the final splicing operation substantially follows the method outlined by the table aforesaid. It is however to be understood that optionally the free ends of strands in the two bundles may be spliced to the corresponding strands in the body of the cable. Such minor deviation from the table aforesaid will not appreciably alter the ultimate result.

When the splicing operation has been completed a spliced joint 16 will have been made, as shown in Fig. 7, which joint not only effects a symmetrical appearance, but also is strong, capable of withstanding pull and stress of great degree.

While there is described herein a preferred embodiment of the present invention, it is nevertheless to be understood that minor changes may be made therein without departing from the spirit and scope of the invention as claimed.

What I claim as new is:

1. The method of forming an eye in a cable which comprises the steps of unlaying the end of a cable into a pair of bundles each containing a plurality of strands, the inner ends of said bundles in conjunction with the adjacent end of the body of the cable defining a crotch, crossing said bundles at points intermediate their ends, mutually intertwining said bundles toward said crotch for preforming an eye, passing the free ends of some of the strands of each bundle through the preformed eye so as to divide the free ends of the strands of each bundle between the two sides of the plane of the preformed eye, and then splicing the free ends of all of the strands of the two bundles to the strands in the body of the cable adjacent said crotch.

2. The method of forming an eye in a cable which comprises the steps of unlaying the end of a cable into a pair of bundles each containing a plurality of strands, the inner ends of said bundles in conjunction with the adjacent end of the body of the cable defining a crotch, crossing said bundles at points intermediate their ends, mutually intertwining said bundles toward said crotch for preforming an eye, passing the free ends of some of the strands of each bundle through the preformed eye so as to divide the free ends of the strands of each bundle between the two sides of the plane of the preformed eye, maintaining the free ends of the strands which have been passed through the preformed eye in an outwardly overlapped condition with relation to the free ends of the strands of the other bundle which have been left on that side of the plane of the preformed eye, and then splicing the free ends of all of the strands in the two bundles to the strands in the body of the cable adjacent said crotch.

3. The method of forming an eye in a cable which comprises the steps of unlaying the end of a cable into a pair of bundles each containing a plurality of strands, the inner ends of said bundles in conjunction with the adjacent end of the body of the cable defining a crotch, crossing said bundles at points intermediate their ends, mutually intertwining said bundles toward said crotch for preforming an eye, passing the free ends of some of the strands of each bundle through the preformed eye so as to divide the free ends of the strands of each bundle between the two sides of the plane of the preformed eye, maintaining the free ends of the strands which have been passed through the preformed eye in an outwardly overlapped condition with relation to the free ends of the strands of the other bundle which have been left on that side of the plane of the preformed eye, splicing the free end of at least one of the overlapped strands on each side of the plane of the preformed eye to the same strand in the body of the cable, and splicing the free ends of the remaining strands on each side of the preformed eye to the non-corresponding strands in the body of the cable.

4. The method of forming an eye in a cable which comprises the steps of unlaying the end of a cable into a pair of bundles each containing a plurality of strands, the inner ends of said bundles in conjunction with the adjacent end of the body of the cable defining a crotch, crossing said bundles at points intermediate their ends, mutually intertwining said bundles toward said crotch for preforming an eye, commingling the free ends of a portion of each bundle on each side of the plane of the preformed eye, and then splicing the free ends of all of the strands of the two bundles to the strands in the body of the cable.

5. The method of forming an eye in a cable which comprises the steps of unlaying the end of a cable into a pair of bundles each containing a plurality of strands, the inner ends of said bundles in conjunction with the adjacent end of the body of the cable defining a crotch, crossing said bundles at points intermediate their ends, mutually intertwining said bundles toward said crotch for preforming an eye, passing the free ends of some of the strands of each bundle through the preformed eye so as to divide the free ends of the strands of each bundle between the two sides of the plane of the preformed eye, and then splicing the free ends of each group of the strands remaining on each side of the plane of the preformed eye to the group of strands in the body of the cable which remains on the same corresponding side of the plane of the preformed eye adjacent said crotch.

6. In a cable, an eye composed of two component integral bundles, each containing a plurality of strands, said bundles being overlapped on each other and intertwined with each other, the bases of said bundles in conjunction with the body of the cable forming a crotch, a number of strands of one bundle being commingled with a number of strands in the other bundle on each side of the crotch, the commingled group of strands on each side of the crotch being spliced to the strands in the body of the cable.

7. In a cable, an eye composed of two component integral bundles, each containing a plurality of strands, said bundles being overlapped on each other and intertwined with each other, the bases of said bundles in conjunction with the body of the cable forming a crotch, a number of strands of one bundle being commingled with a number of strands in the other bundle on each side of the crotch, the majority of the commingled strands on each side of the crotch being spliced to the non-corresponding strands in the body of the cable.

8. In a cable, an eye composed of two component integral bundles, each containing a plurality of strands, said bundles being overlapped on each other and intertwined with each other, the bases of said bundles in conjunction with the body of the cable forming a crotch, a number of strands of one bundle being commingled with a number of strands in the other bundle on each side of the crotch, the commingled group of strands on each side of the crotch being spliced to the strands in the body of the cable which are in the nearest proximity to the crotch on the corresponding side of the latter.

JOSEPH BUDZINSKI.

REFERENCES CITED

The following references are of record in the file of this patent:

UNITED STATES PATENTS

| Number | Name | Date |
| --- | --- | --- |
| 1,334,244 | Howe | Mar. 16, 1920 |